United States Patent
Wang

(10) Patent No.: US 6,488,160 B2
(45) Date of Patent: Dec. 3, 2002

(54) FOLDING COLLAPSIBLE CLOTHES RACK

(76) Inventor: Wen-Tsan Wang, PO Box 82-144, Taipei (TW)

( * ) Notice: Subject to any disclaimer, the term of this patent is extended or adjusted under 35 U.S.C. 154(b) by 0 days.

(21) Appl. No.: 09/796,496

(22) Filed: Mar. 2, 2001

(65) Prior Publication Data

US 2002/0121493 A1 Sep. 5, 2002

(51) Int. Cl.[7] .............................................. A47B 43/00
(52) U.S. Cl. ...................................... 211/195; 280/79.3
(58) Field of Search ......................... 211/195, 200–202, 211/189, 206; 248/128, 129, 150, 151, 165, 166; 312/108, 257.1, 258, 264, 265.1, 265.4, 263.4; 280/79.3

(56) References Cited

U.S. PATENT DOCUMENTS

| | | | |
|---|---|---|---|
| 989,433 A | * | 4/1911 | Schmitt |
| 1,655,593 A | * | 1/1928 | Bulman |
| 2,589,269 A | * | 3/1952 | Magnuson et al. |
| 2,645,538 A | * | 7/1953 | Segal |
| 2,894,644 A | * | 7/1959 | Magnuson et al. |
| 2,985,316 A | * | 5/1961 | Ruhnke |
| 3,240,505 A | * | 3/1966 | Schlernitzauer ............ 280/79.3 |
| 3,861,695 A | * | 1/1975 | Shourek et al. ............ 280/79.3 |
| 3,968,883 A | * | 7/1976 | Farmer ........................ 211/201 |
| 4,275,665 A | * | 6/1981 | Silverman .................. 280/79.3 |
| 4,523,768 A | * | 6/1985 | Dlubala ...................... 280/79.3 |
| 4,757,769 A | * | 7/1988 | Suttles ........................ 211/189 |
| 4,978,013 A | * | 12/1990 | Hogg .......................... 211/195 |
| 5,090,725 A | * | 2/1992 | Feldner ...................... 211/189 |
| 5,351,843 A | * | 10/1994 | Wichman et al. ........... 211/195 |
| 5,439,152 A | * | 8/1995 | Campbell .................... 211/195 |
| 5,560,502 A | * | 10/1996 | Hsiung ....................... 211/195 |
| 5,577,622 A | * | 11/1996 | Kapteyn ..................... 211/195 |
| 5,603,419 A | * | 2/1997 | Peterson .................... 211/195 |
| 5,617,962 A | * | 4/1997 | Chen .......................... 211/206 |
| 5,645,259 A | * | 7/1997 | Chen .......................... 211/195 |
| 5,660,637 A | * | 8/1997 | Dodge ........................ 280/79.3 |
| 5,718,344 A | * | 2/1998 | Joldeson et al. ............ 211/206 |
| 5,738,365 A | * | 4/1998 | McCarthy .................. 280/79.3 |
| 5,806,864 A | * | 9/1998 | Zielinski et al. ........... 280/79.3 |
| 5,913,270 A | * | 6/1999 | Price .......................... 211/201 |
| 6,105,797 A | * | 8/2000 | Haisma ...................... 211/195 |
| 6,149,021 A | * | 11/2000 | Beaulieu .................... 211/201 |
| 6,279,763 B1 | * | 8/2001 | Bush .......................... 211/195 |

* cited by examiner

Primary Examiner—Daniel P. Stodola
Assistant Examiner—Jennifer E. Novosad
(74) Attorney, Agent, or Firm—Leong C. Lei

(57) ABSTRACT

A folding collapsible clothes rack includes two wheeled side frames, two retractable side frames moved in and out of the wheeled side frames and releasably locked by lock screws, two pivoted links coupled between the wheeled side frames, a bottom frame, the bottom frame having a fixed end hinged to one wheeled side frame and a free end adapted for supporting on a bearing bar at the other wheeled side frame, and a top frame, the top frame having a fixed end hinged to one retractable frame and a free end adapted for supporting on the other retractable frame.

1 Claim, 6 Drawing Sheets

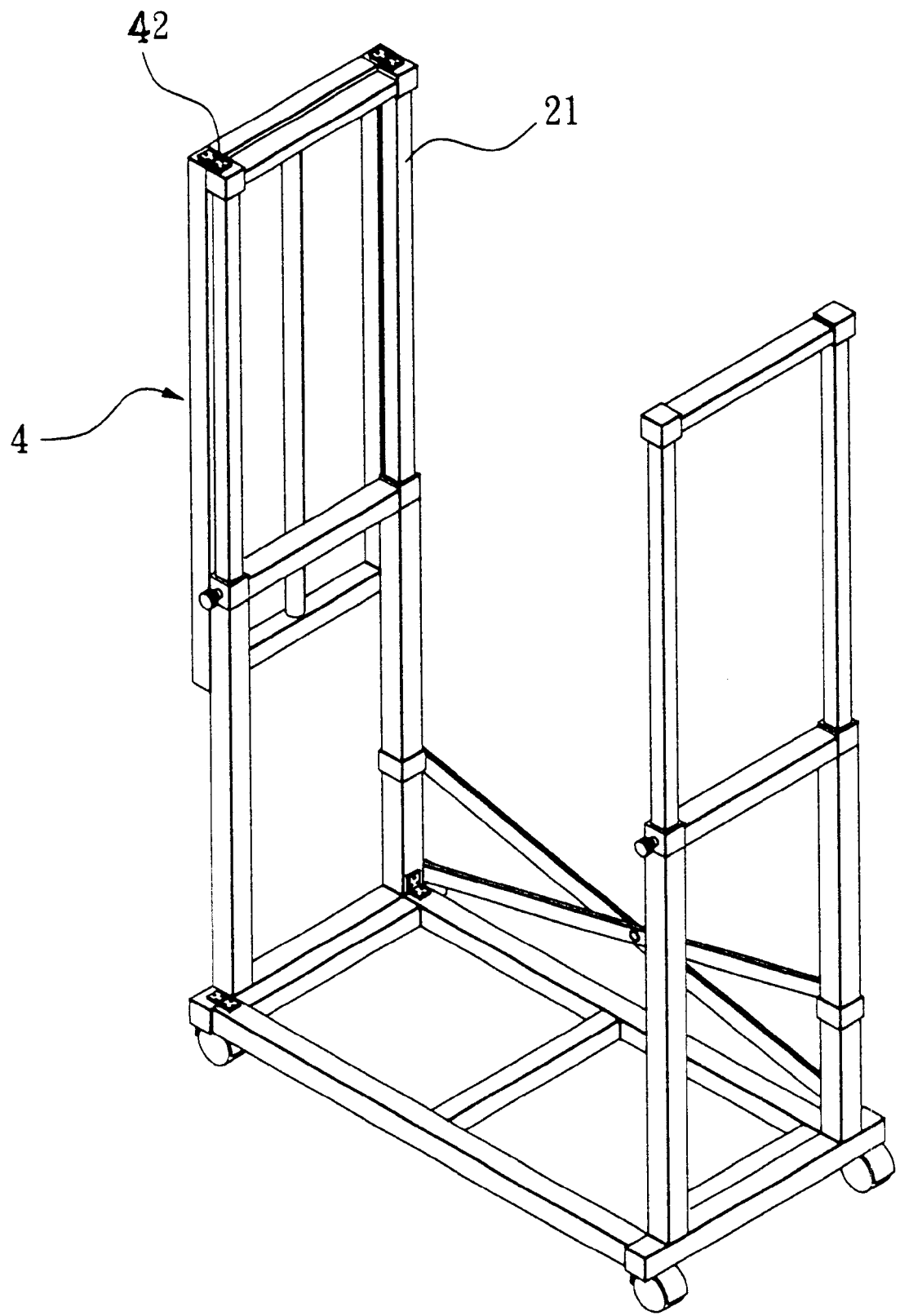
F I G. 2

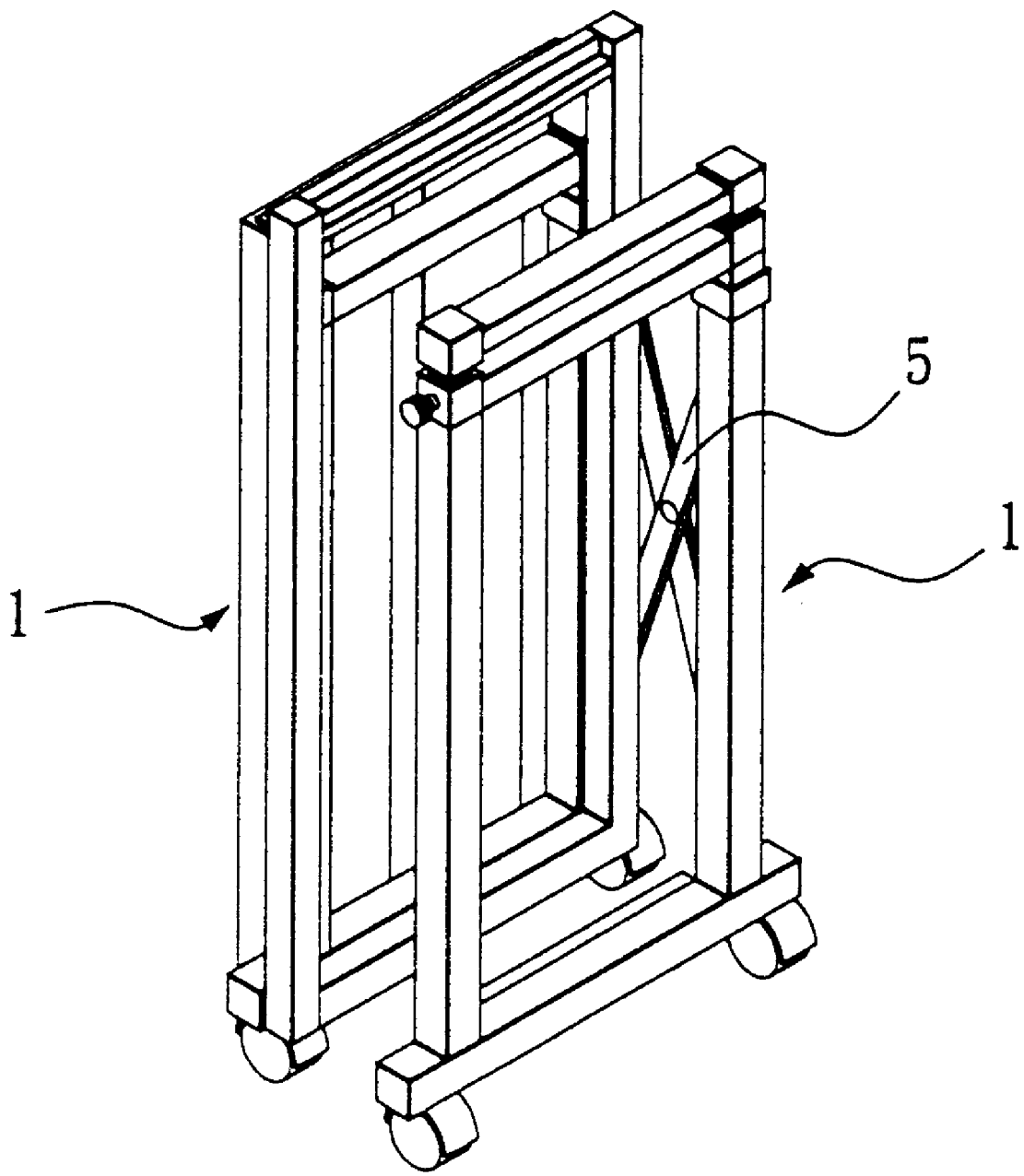
F I G. 5

FOLDING COLLAPSIBLE CLOTHES RACK

BACKGROUND OF THE INVENTION

The present invention relates to a clothes rack for hanging clothes and, more particularly, to such a clothes rack, which is folding collapsible.

Conventional clothes racks for home use or for use in shops for exhibiting commercial products are commonly made of wooden slats, metal tubes, or plastic members. These conventional clothes racks require much storage space when not in use because they are not collapsible. There are also known detachable clothes racks. When not in use, a detachable clothes rack can be collapsed. However, when the parts of a detachable clothes rack are detached, they must be well kept. If one part of a detachable clothes rack is lost, the detachable clothes rack can no longer be set up again.

SUMMARY OF THE INVENTION

The present invention has been accomplished to provide a folding collapsible clothes rack, which eliminates the aforesaid problems. It is one object of the present invention to provide a clothes rack, which is folding collapsible. It is another object of the present invention to provide a folding collapsible clothes rack, which can be easily collapsed without detaching any part thereof. According to one aspect of the present invention, the folding collapsible clothes rack comprises two wheeled side frames, two retractable side frames moved in and out of the wheeled side frames and releasably locked by lock screws, two pivoted links coupled between the wheeled side frames, a bottom frame, the bottom frame having a fixed end hinged to one wheeled side frame and a free end adapted for supporting on a bearing bar at the other wheeled side frame, and a top frame, the top frame having a fixed end hinged to one retractable frame and a free end adapted for supporting on the other retractable frame. According to another aspect of the present invention, the top frame has a longitudinally extended hanging rod for hanging clothes and the like.

BRIEF DESCRIPTION OF THE DRAWINGS

FIG. 2 is similar to FIG. 1 but showing the top frame turned to the collapsed position.

FIG. 5 shows the folding collapsible clothes rack fully collapsed according to the present invention.

DETAILED DESCRIPTION OF THE PREFERRED EMBODIMENT

Figure 1:
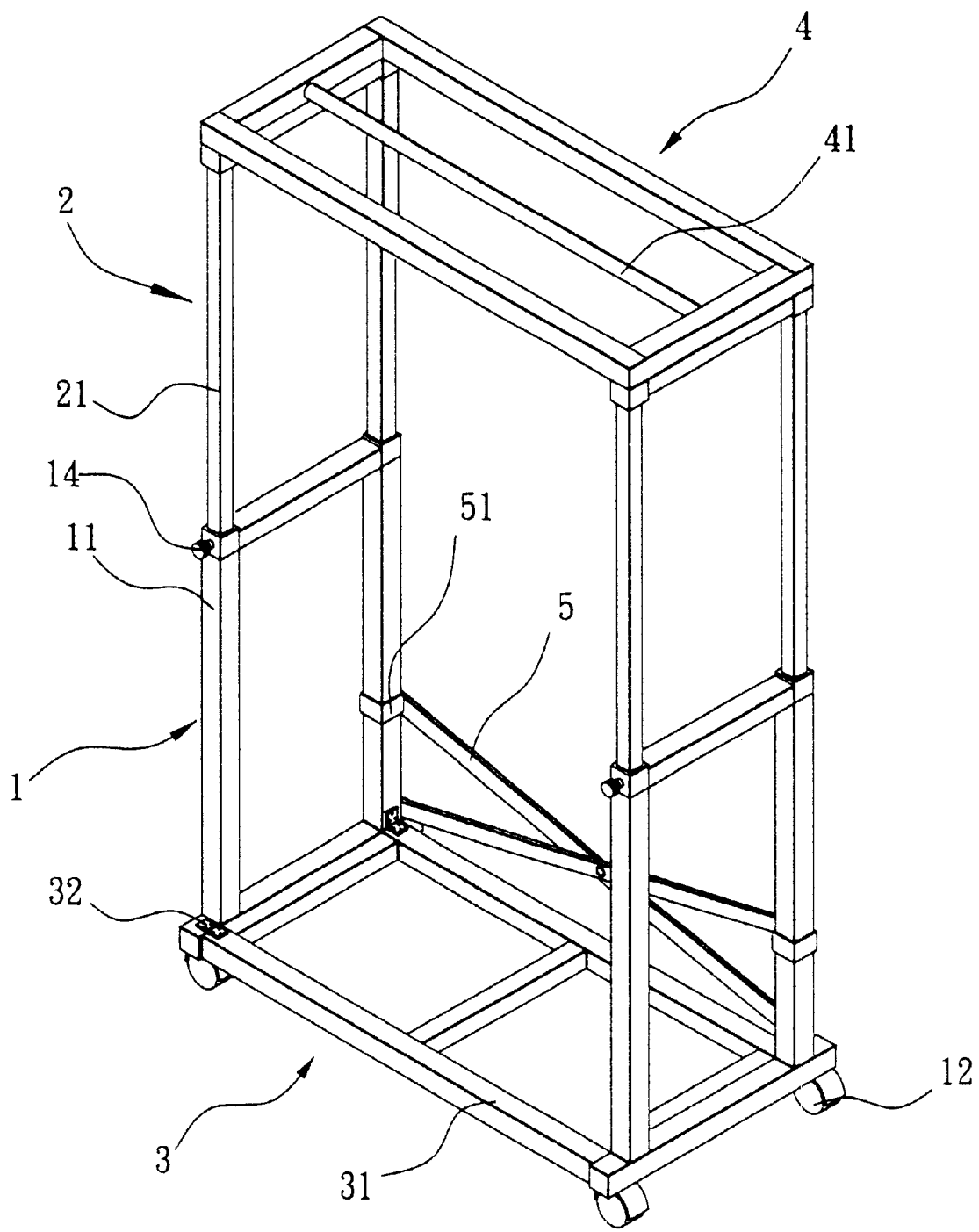
FIG. 1 is an elevational view of a folding collapsible clothes rack when set up.

Referring to FIGS. from 1 through 5, a folding collapsible clothes rack in accordance with the present invention is shown comprised of two fixed side frames 1, two retractable side frames 2, a bottom frame 3, a top frame 4, and two reinforcing links 5. The fixed side frames 1 support the load on the bottom frame 3, each comprising two upright tubes 11 arranged in parallel, a lock screw 14 transversely provided at each tube 11 near the top, and two wheels 12 bilaterally provided at the bottom side. One side frame 1 is provided with a transversely extended bearing member 13 near the bottom side (see FIG. 3). The reinforcing links 5 are pivoted together at the respective middle part, each having one end pivoted to one of the fixed side frames 1 and the other end provided with a slide 51 coupled to the other of the fixed side frames 1. The retractable side frames 2 are moved in and out of the tubes 11 of the fixed side frames 1, and fastened up at the desired elevation by the lock screws 14. The retractable side frames 2 each comprise two parallel tubes 21 respectively inserted into the tubes 11 of the fixed side frames 1. The bottom frame 3 is an open frame formed of a plurality of frame bars 31, having one end hinged to one fixed side frame 1 without the bearing member 13 by a hinge 32 and the other end provided with a transversely extended locating groove 33 (see FIG. 3). When turning the bottom frame 3 to the horizontal position, the transversely extended locating groove 33 is forced into engagement with the bearing member 13. The top frame 4 has a longitudinally extended hanging rod 41 for hanging clothes or the like. One end of the top frame 4 is hinged to one retractable side frame 2 by a hinge 42 (see FIG. 2). The other end of the top frame 4 is a free end that can be supported on the top of the other retractable side frame 2.

Referring to FIGS. From 1 through 5 again, when in use, the fixed side frames 1 are moved apart to the extent. At this time the reinforcing links 5 are forced to make a scissors action. The lock screws 14 are then loosened, for enabling the retractable side frames 2 to be adjusted to the desired elevation. After adjustment, the lock screws 14 are locked again. Thereafter, the bottom frame 3 is turned to the horizontal position to force the locating groove 33 into engagement with the bearing member 13, and then the frame 4 is turned to the horizontal position, enabling its free end to be supported on the other retractable side frame 2. Thus, clothes can be hung on the hanging rod 41 of the top frame 4.

Figure 3:
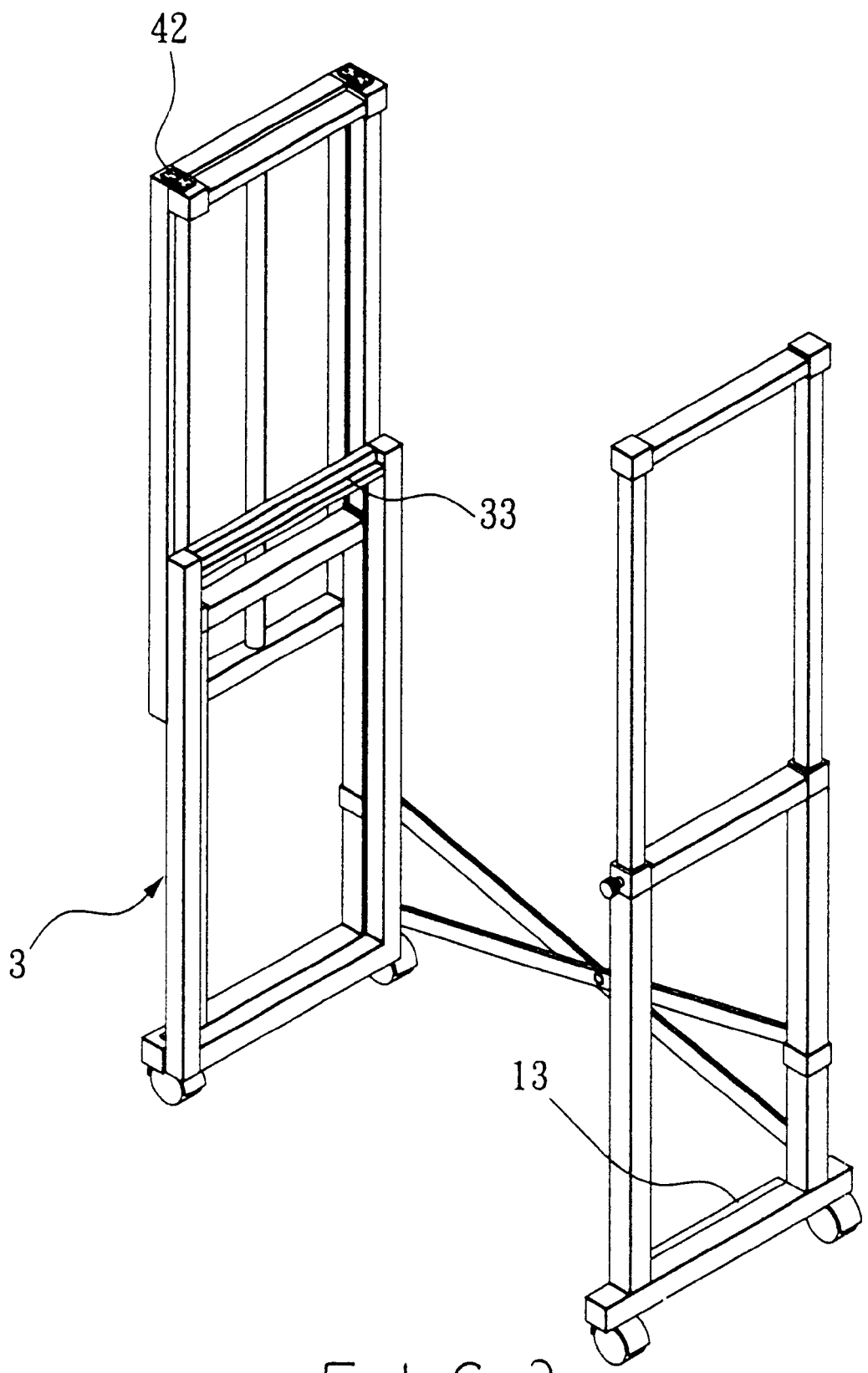
FIG. 3 is similar to FIG. 2 but showing the bottom frame turned from the horizontal position to the vertical position.
Figure 4:
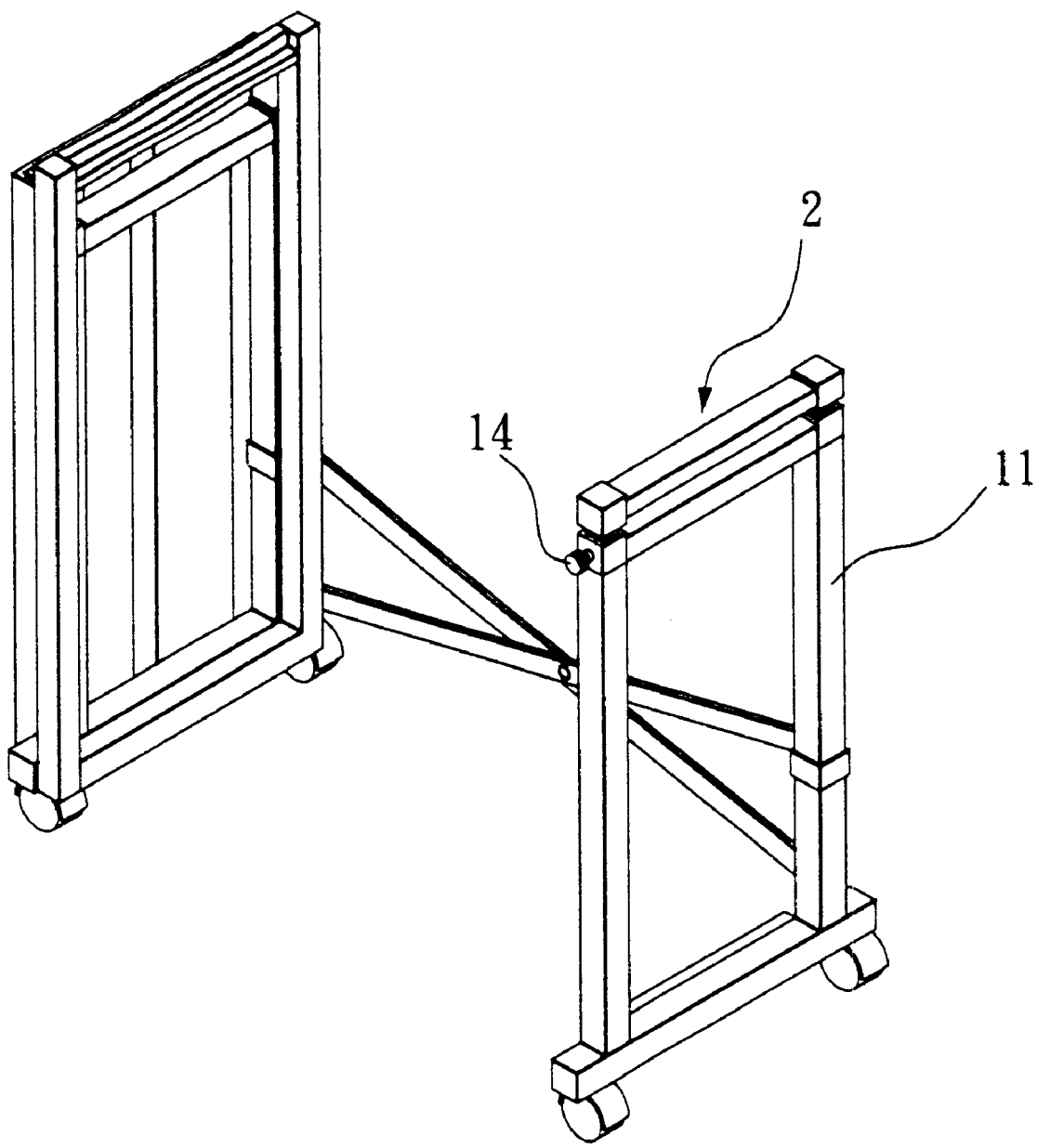
FIG. 4 is similar to FIG. 3 but showing the retractable side frames lowered to the lower limit position.

When not in use, the top frame 4 is turned outwards from the horizontal position shown in FIG. 1 to the vertical position shown in FIG. 2, and then the bottom frame 3 is turned upwards from the horizontal position shown in FIG. 1 to the vertical position shown in FIG. 3, and then the lock screws 14 are loosened for enabling the retractable side frames 2 to be lowered to the lower limit position in the fixed side frames 1 as shown in FIG. 4, and when the fixed side frames 1 are moved toward each other to collapse the whole structure as shown in FIG. 5.

Figure 6:
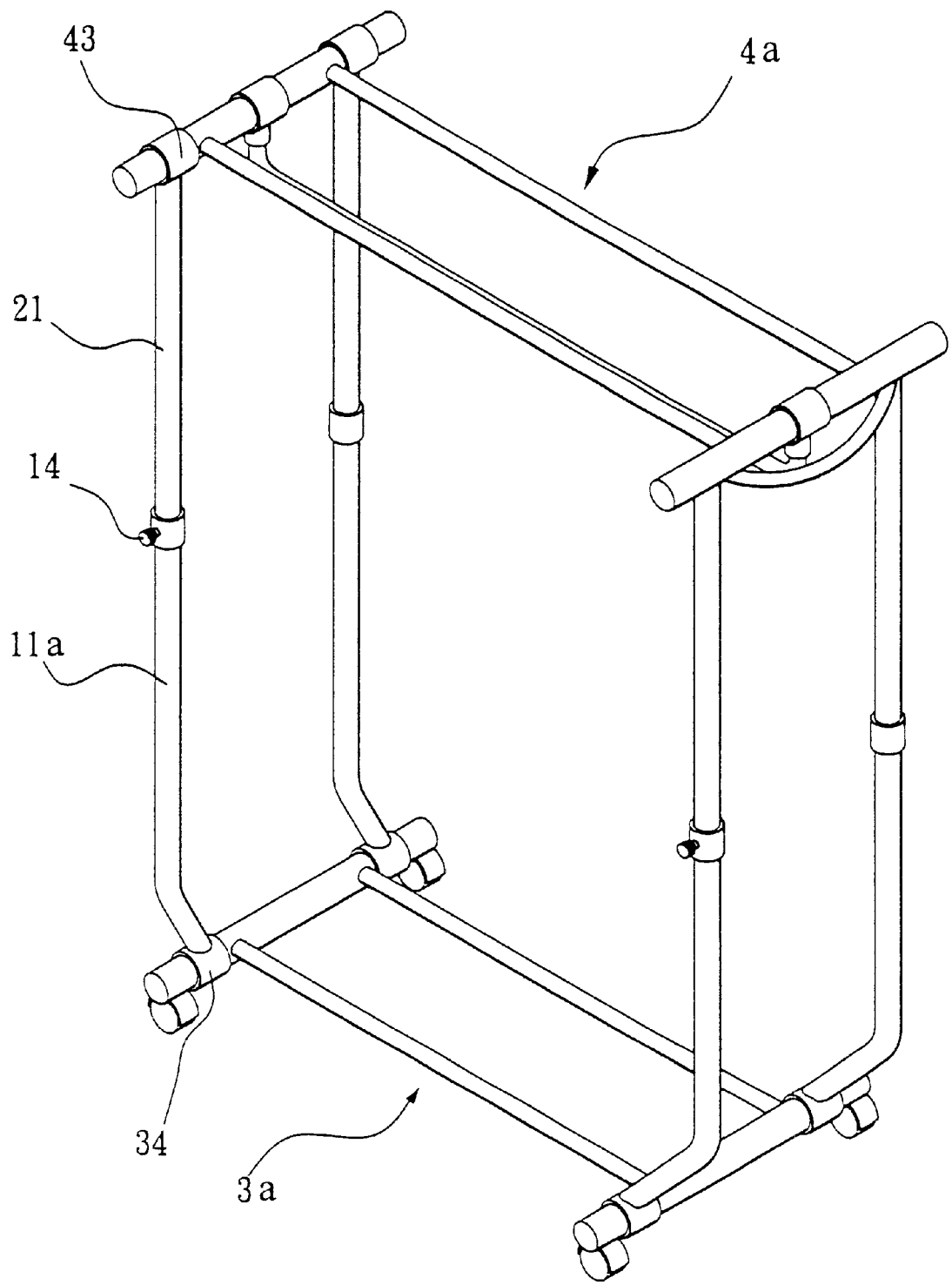
FIG. 6 shows an alternate form of the present invention.

FIG. 6 shows an alternate form of the folding collapsible clothes rack. According to this embodiment, the tubes 11a and 21 are round tubes: the tubes 11a each have a bottom end terminating in a ring 34 respectively coupled to the bottom frame 3a. Thus, the tubes 11a can be turned downwards and closely attached to the bottom frame 3a. Further, the top frame 4a has one end provided with rings 43 respectively coupled to one retractable side frame 2. The other end of the top frame 4a is a free end. Thus, the top frame 4a can be turned between the horizontal position and the vertical position.

It is to be understood that the drawings are designed for purposes of illustration only, and are not intended for use as a definition of the limits and scope of the invention disclosed.

What the invention claimed is:

1. A folding collapsible clothes rack comprising:
   two fixed side frames, said fixed side frames defining a first fixed side frame and a second fixed side frame each comprising two upright tubes arranged in parallel, said second fixed side frame having a transversely extending bearing member;
   two links pivoted together and coupled between said fixed side frames, said links each having one end pivotally connected to one of said fixed side frames and an opposite end provided with a slide sliding on the other of said fixed side frames;

two retractable side frames respectively inserted into the upright tubes of said fixed side frames so that the retractable side frames can be moved in and out of the respective fixed side frame, said retractable side frames each comprising two parallel tubes respectively inserted into the upright tubes of said fixed side frames;

locking means respectively provided on the upright tubes of said fixed side frames and adapted to lock said retractable side frames at a desired elevation;

a top frame, said top frame having a fixed end pivotally connected to one of said retractable side frames and a free end adapted to be supported on the other of said retractable side frames, said top frame including a longitudinally extending hanging rod; and a bottom frame, said bottom frame having a fixed end pivotally connected to said first fixed side frame and a free end adapted to be supported on the bearing member of said second fixed side frame, said bottom frame having a bottom side equipped with a plurality of wheels.

* * * * *